United States Patent
Sheng (10) Patent No.: US 11,042,644 B2
(45) Date of Patent: Jun. 22, 2021

(54) METHOD AND SYSTEM FOR SECURITY VERIFICATION IN A BOOTING PROCESS WITH A MULTI-CORE PROCESSOR

(71) Applicant: Quixant PLC, Cambridgeshire (GB)

(72) Inventor: Wang Chih Sheng, New Taipei (TW)

(73) Assignee: QUIXANT PLC, Cambridgeshire (GB)

( * ) Notice: Subject to any disclaimer, the term of this patent is extended or adjusted under 35 U.S.C. 154(b) by 222 days.

(21) Appl. No.: 15/886,256

(22) Filed: Feb. 1, 2018

(65) Prior Publication Data

US 2019/0236280 A1    Aug. 1, 2019

(51) Int. Cl.
*G06F 9/44* (2018.01)
*G06F 21/57* (2013.01)
*G06F 9/50* (2006.01)
*G06F 9/4401* (2018.01)
*G06F 21/64* (2013.01)

(52) U.S. Cl.
CPC .......... *G06F 21/575* (2013.01); *G06F 9/4401* (2013.01); *G06F 9/4405* (2013.01); *G06F 9/5027* (2013.01); *G06F 21/64* (2013.01)

(58) Field of Classification Search
CPC .... G06F 9/44502; G06F 9/44508; G06F 1/24; G06F 9/44526; G06F 15/177; G06F 9/44514; G06F 9/44523; G06F 11/1417; G06F 9/44505
See application file for complete search history.

(56) References Cited

U.S. PATENT DOCUMENTS

| | | | | |
|---|---|---|---|---|
| 7,367,889 B2* | 5/2008 | Canterbury | ............. | G06F 21/51 463/43 |
| 2008/0045342 A1* | 2/2008 | Crowder, Jr. | ......... | G06F 9/4403 463/42 |
| 2011/0117984 A1* | 5/2011 | Shimabukuro | ......... | G07F 17/32 463/16 |
| 2011/0126209 A1* | 5/2011 | Housty | ................. | G06F 9/4405 718/105 |
| 2013/0013906 A1* | 1/2013 | Brown | .................. | G06F 21/575 713/2 |
| 2013/0124845 A1* | 5/2013 | Wang | .................... | G06F 21/554 713/2 |
| 2013/0275691 A1* | 10/2013 | Chew | ...................... | G06F 12/00 711/154 |
| 2014/0250291 A1 | 9/2014 | Adams et al. | | |
| 2018/0107201 A1* | 4/2018 | Cu-Unjieng | ....... | G05B 23/0208 |

* cited by examiner

*Primary Examiner* — Zahid Choudhury
(74) *Attorney, Agent, or Firm* — Kwan & Olynick LLP (57) ABSTRACT

The disclosure is related to a method and a system for security verification in a booting process of a computer system. A multi-core processor of the computer system is utilized to perform a security verification operation initiated by a UEFI BIOS. The security verification operation is configured to test if the computer system is qualified as a secure system for a specific use. In one aspect, the multi-core processor architecture has the benefit of providing a more efficient way to allow each of the multiple cores to perform one verification task for one of the peripherals of the system. An embodiment shows that the multiple cores can be individually assigned to perform different tasks such as verifying security of various medium in parallel processes when the computer system is in the booting process.

14 Claims, 5 Drawing Sheets

METHOD AND SYSTEM FOR SECURITY VERIFICATION IN A BOOTING PROCESS WITH A MULTI-CORE PROCESSOR

BACKGROUND OF THE INVENTION

1. Field of the Invention

The present disclosure relates to gaming machine systems and software. More particularly it relates to security verification in gaming machines that use a multi-core processor.

2. Description of Related Art

A gaming system is initialized when a computer boots up. At first, the basic input/output system (BIOS) initiates the computer's booting sequence. The system hardware data recorded in the BIOS is loaded to drive various peripherals. To overcome the restriction of traditional BIOS operating with restricted functions, a Unified Extensible Firmware Interface (UEFI) BIOS was introduced.

The UEFI BIOS is a framework with a flexible driver module that enables extending its functionality. The UEFI BIOS is able to expand its drivers when compared with the memory type of a traditional BIOS, which does not readily support modification. The UEFI BIOS also identifies hardware in the computer system, controls and allocates system resources to the hardware peripherals, and allocates memory. The Extensible Firmware Interface is generally used for communicating within the system among hardware, firmware, and the operating system.

However, the booting process performed by the BIOS is configured based on a set of global NVRAM variables, including boot variables that indicate paths to the loaders. The boot variables for the UEFI BIOS render an environment that enables UEFI applications, such as interaction between the operating system and the firmware. These UEFI variables are modifiable as the booting process allows the operating system to manage certain settings of the firmware.

However, these features of UEFI BIOS may threaten systems, such as modifiability, such as the gaming computer system that requires high-security verification. To verify the UEFI BIOS and other storage mediums of the system, the verification in the booting stage should occur.

SUMMARY OF THE INVENTION

In one aspect of the present invention, a method of verifying gaming system software and other software in a gaming machine is described. The gaming machine has a multi-core processor, a cryptographic module, and storage media. A Unified Extensible Firmware Interface (UEFI) of the gaming machine's BIOS is initiated. One of the cores of the processor is allocated to verifying the UEFI BIOS of the gaming machine. Another core is allocated to verifying the operating system. A third core is allocated to verifying the gaming system software of the gaming machine. The UEFI BIOS, the operating system, and the gaming machine software are stored in one or more storage media in the gaming machine. These verifications are performed in parallel and during the booting up process of the gaming machine. If all verifications show that none of the software has been tampered with, the gaming machine completes boot up and proceeds with normal operation.

In one embodiment, a UEFI BIOS digest is created by the cryptographic module reflecting an initial and untampered (known and good) state of the UEFI BIOS. Similarly, an operating system digest is created by the module also reflecting an initial and untampered state of the operating system of the gaming machine. A gaming system digest is also calculated from a known and good version of the gaming system code, also calculated by the cryptographic module. At boot-up time, a UEFI BIOS digest, an operating system digest, and a gaming system digest are created. In one embodiment, the initial digests for the UEFI BIOS, operating system, and gaming software, are compared to boot-up time digests to see if there are any differences. If there are none, the gaming machine can proceed with normal operations. If there are any differences in the digests, implying tampering with code of one of the subsystems, the gaming machine is prevented from continuing with operation. These comparisons of the digests are performed by the cryptographic module.

DETAILED DESCRIPTION OF THE PREFERRED EMBODIMENTS

The present invention will now be described more fully with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The modifiable UEFI BIOS (Unified Extensible Firmware Interface Basic Input/Output System) is gradually being widely adopted by modern computer systems. The UEFI BIOS is generally a specification for initializing the firmware programs of hardware such as booting a computer system. However, the characteristics of the UEFI BIOS may also bring computer systems that demand high security level to risk. For example, a gaming computer system cannot tolerate any security threat that may render the system vulnerable to attack by unauthorized persons and/or malware. When the computer system starts and runs the booting process, the gaming computer system should be strictly verifying its firmware and operating system. The verification aims to prevent improper tampering or modification of the program codes, lest any illegal code be hidden behind the programs. The mentioned security verification allows the gaming computer system to operated correctly and without security threats and meet gaming regulatory requirements.

Furthermore, a multi-core processor is a single computing component with two or more cores that are the actual processing units. When a computer system with the multi-core processor is in an initialization procedure of the booting process of the system, a multi-core processing sequence in the multi-core processor is initiated to enable the multiple cores to enter into an operating status. During the booting process of the computer system, the multi-core processor is initialized to enable multiple sequences respectively for the multiple cores. An MP-service protocol is introduced to manage an initialization process of the multi-core processor of the computer system. Through the MP-service protocol, the multiple cores can be selectively enabled or disabled on demand and the number of the logical processing cores of the multi-core processor can be detected in the booting process. The MP-service protocol defines two classes of processors: the bootstrap processor (BSP) and the application processors (APs). Following a power-up or RESET process of the computer system with the multi-core processor, a sequence running the MP-service protocol dynamically selects one of the processors on the system bus as the BSP, e.g. defining a core '0', and the remaining processors are designated as APs, e.g. defining cores '1, 2, . . . '

The system in accordance with the present disclosure incorporates the mechanism of security verification for securing the computer system with the UEFI BIOS against improper modification during the process of booting. The mechanism of security verification may also be applied to securing other storage mediums other than the memory of the UEFI BIOS of the computer system. Provided herein is a method and a system for security verification in a booting process of a computer system with a multi-core processor. More specifically, the multi-core processor allows the computer system to process multiple tasks in the booting process in parallel under a specific service protocol so as to enhance the booting process and provide a high security solution for the system.

Figure 1:
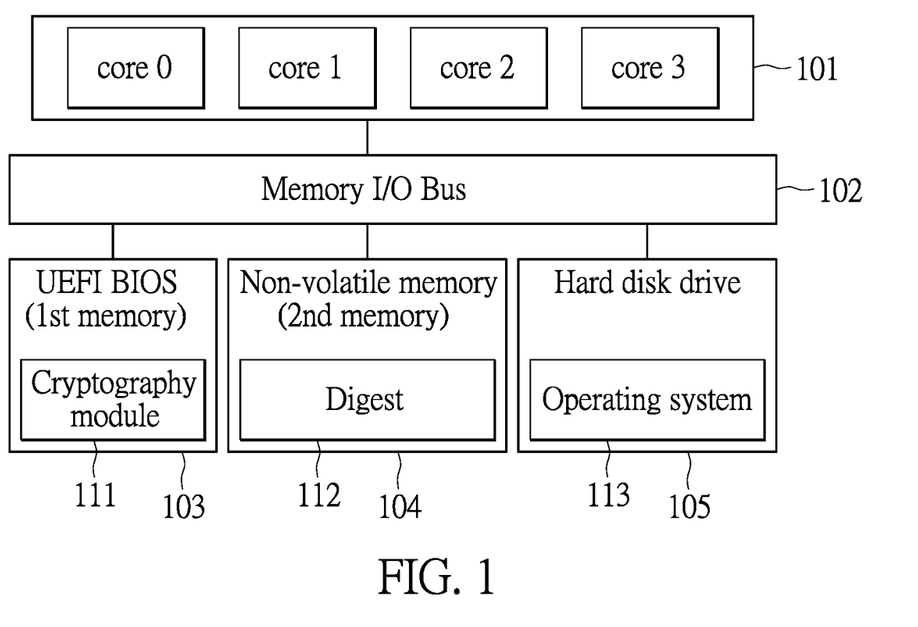
FIG. 1 shows a schematic block diagram depicting a framework of a computer system according to one embodiment of the disclosure.

Reference is made to FIG. 1, which shows a schematic block diagram depicting a framework of a system having the storage medium respectively for the UEFI BIOS, digests and operating system in accordance with the present disclosure.

The block diagram shows a multi-core processor 101 as a central processing circuit for the whole system. It should be noted that the system may adopt two or more multi-core processors. The multi-core processor 101 is a chip packaged with multiple cores. A quad-core processor having one chip with four independent processing cores, e.g. core 0, core 1, core 2 and core 3, is exemplified in the diagram for reading and executing central processing unit (CPU) instructions. The system utilizes a memory I/O bus 102 to connect to the multi-core processor 101 over a front-side bus, and to communicate with some internal memories. The memory I/O bus 102 enables the multi-core processor 101 to access the system resources, and every core is able to access the system resources independently so that the multiple cores can run multiple instructions at the same time. According to one aspect of the present disclosure, several types of storage medium such as a first memory 103 for recording the firmware codes of UEFI BIOS, a second memory 104 for storing a digest 112, and a hard disk drive 105 or other mass storage device that at least stores the programs of an operating system 113 are included. It should be noted that, for implementing the method for security verification in a booting process, a set of instructions in the form of a cryptography module installed in the first memory 103 of UEFI BIOS is provided. According to an exemplary embodiment, the cryptography module is an embedded program installed in the UEFI BIOS and is launched when the UEFI BIOS is initiated.

In an exemplary embodiment, the first memory 103 is such as, but not limited to, a serial peripheral interface (SPI) flash memory that stores the firmware codes of UEFI BIOS. The second memory 104 is a non-volatile memory which may be another SPI flash memory or EEPROM (Electrically Erasable Programmable Read-Only Memory) electrically connected with the first memory 103. The second memory 104 is used to store the known, good digest(s) 112 of the UEFI BIOS or/and operating system. Preferably, the first and second memories (103, 104) are the memory chips mounted on the mainboard of the system.

For operating the system, the system provides additional storage to store the programs of the operating system 113 which is loaded at an end stage of the booting process. A hard disk drive 105 can be used for this purpose but alternative mass storage devices may also be used. In addition, the multi-core processor 101 accesses the hard disk drive 105 through the memory I/O bus 102. In one aspect of the system, the hard disk drive 105 can be one or more logical or physical disk partitions. Namely, the system may include two or more separate logical or physical disk partitions for different operations. For example, the system may prepare a disk for an operating system and another disk for specific use, e.g. a gaming system.

According to one of the embodiments, the UEFI BIOS recorded in the first memory 103 installs a firmware-based driver, e.g. the cryptography module 111. This cryptography module 111 acts as a sequence that performs the security verification for the booting process of the computer system. One of the objectives of the cryptography module 111 is to check if the firmware codes of the UEFI BIOS have been improperly modified. Another objective of the cryptography module 111 is to validate the security and integrity of the hard disk drive 105 or other kinds of storage medium of the system against improper modification.

More specifically, the security verification operation performed in the booting process of the system requires a digest to be calculated for an image with respect to a specific memory block. For example, a digest is such as signature value calculated from the image created in accordance with an initial state or a previously approved state of UEFI BIOS. The operating system of the system also renders another digest that is calculated from its initial state or previously approved state of the operating programs. Further, one more digest in association with an image of an initial state or a previously approved state of a gaming system is also provided. More specifically, digests are created by a bit-to-bit computation of the storage medium that stores the codes of the UEFI BIOS, the operating system and the gaming system, and stored in a specific memory of the computer system. The digest-based security verification operation is introduced to check if any tampering has occurred with the specific content of the storage medium during the booting process.

Figure 2A:
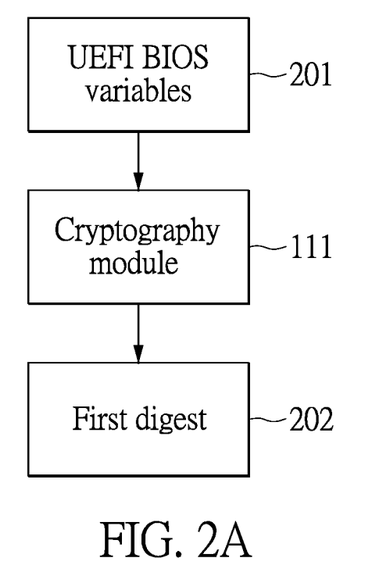
FIG. 2A shows a diagram depicting a digest generated by a cryptography module in one embodiment of the present disclosure.

Reference next is made to FIG. 2A showing a diagram depicting a digest generated by the cryptography module in accordance with the present disclosure.

While the variables of the UEFI BIOS are modifiable during the booting process, the mechanism of the security verification operation in one embodiment of the disclosure is provided for the system to verify the UEFI BIOS 201, i.e. to check if the UEFI BIOS variables have been tampered with. It should be noted that a variable block of UEFI BIOS can be secured by a hardware-based or software-based verification method. For securing the UEFI BIOS against improper tampering, as shown in the diagram, a first, known and authentic digest 202 is created by the cryptography module 111 installed in the UEFI BIOS based on an initial state of the UEFI BIOS 201. The first digest 202 acts as a reference for the system to compare with an instant digest created by the cryptography module 111 when the UEFI BIOS 201 is initiated in the booting process. The security verification operation can determine whether or not the firmware of the UEFI BIOS 201 has been tampered with according to a result of the comparison.

Similarly, the mechanism of security verification operation is also applicable to other storage mediums that store the instructions of the operating system of the computer system. In particular, for securing a gaming system, the security verification operation initiated by the cryptography module will be applied to the storage medium that stores the instructions of the gaming system. The relevant reference is made to FIG. 2B that shows another diagram depicting a second digest (204) generated by the cryptography module 111.

Figure 2B:
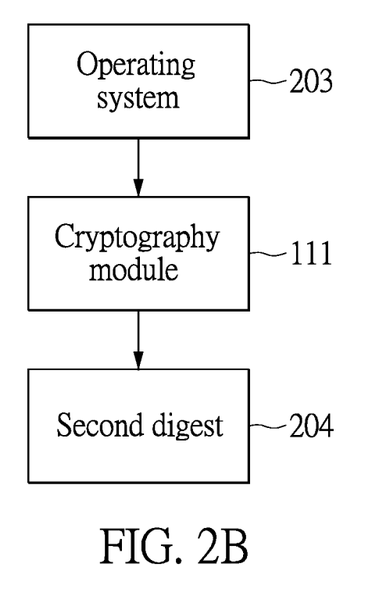
FIG. 2B shows another diagram depicting a digest generated by a cryptography module in another embodiment of the present disclosure.

FIG. 2B shows an operating system (203) of the apparatus that is under the mechanism of security verification for preventing the improper modification. The mechanism of the security verification operation in another embodiment of the disclosure is provided for the system to verify the operating system 203, i.e. to check if the storage medium storing the instructions of operating system 203 has undergone any improper modification. A second digest 204 in this approach is created by the cryptography module 111 installed in the UEFI BIOS based on an initial state of the operating system 203. The same approach is also applied to the gaming system in the computer system. The second digest 204 also acts as a reference for the system to compare with an instant digest created by the cryptography module 111 when the storage medium of the system is initiated in the booting process. The security verification operation can determine whether or not the operating system 203 and/or the gaming system have been tampered with according to a result of the comparison.

The aforementioned approaches essentially incorporate the digests (202, 204) created in accordance with the initial state or previous approved state of the UEFI BIOS and operating system/gaming system to act as secured digests (202, 204) for performing the security verification operation while compared with the instant digest(s) that are computed in every booting process of the computer system. The result of the comparison shows whether the firmware of BIOS and the storage medium have been tampered with or not. It should be noted that, the secured digest (202, 204) may be updated from any approved state of the UEFI BIOS or operating system/gaming system when the UEFI BIOS variables (201) or operating system partition/volume (203) are required to be modified on the premise that the modification is allowed by an approval system administrator.

Figure 3:
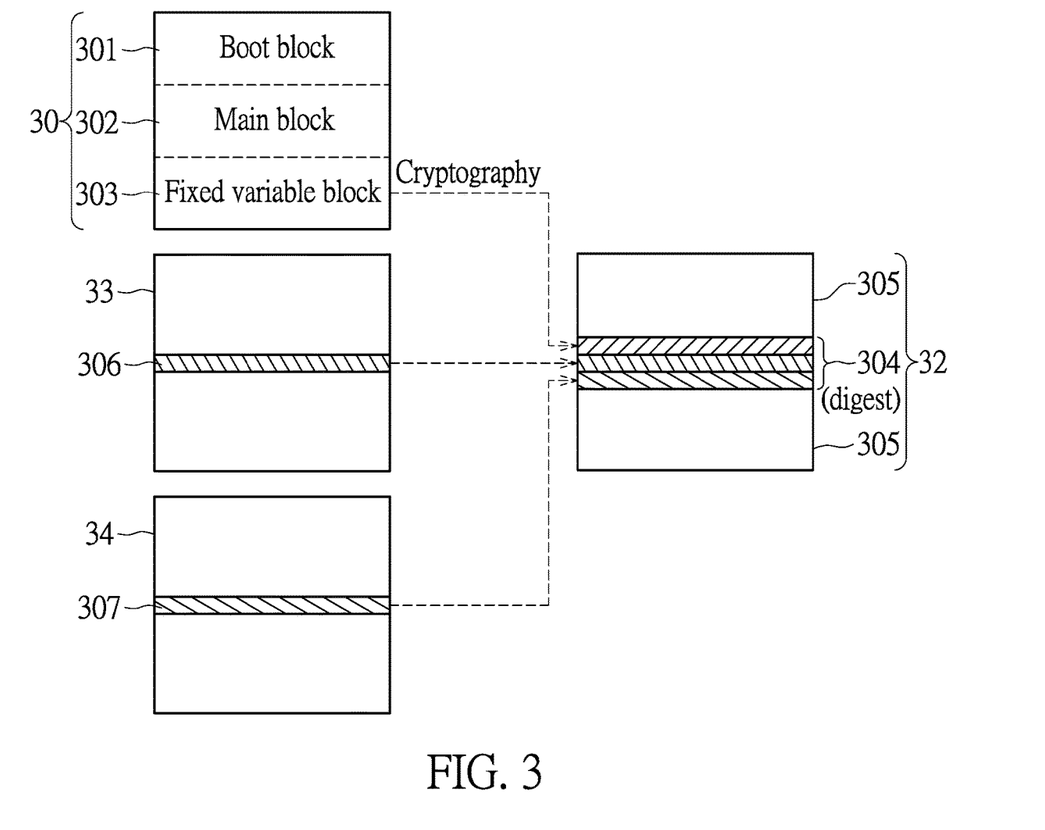
FIG. 3 schematically shows the memory blocks used to store the digests generated from the UEFI BIOS, operating system and gaming system in an example of the present disclosure.

The secured digests (202, 204) should be securely saved to a specific storage space with an appropriate encryption algorithm. FIG. 3 schematically shows the framework of the system at least having a memory for UEFI BIOS and a memory for digest(s) in accordance with the present disclosure.

A first memory 30 shown in the diagram is used to store the firmware program of the UEFI BIOS. For passing the security verification, the UEFI BIOS can be secured with a write-protected variable block. This first memory 30 is such as a rewritable flash drive or any other non-volatile memory.

For example, SPI (serial peripheral interface) flash is one of the options for implementing the first memory 30. A second memory 32 may be another SPI flash drive or EEPROM for recording the digest. The first memory 30 and second memory 32 may be physically on the same device with the digests stored in encrypted form within the SPI flash for the UEFI BIOS. Alternatively, the second memory 32 may also indicate the hard disk or other types of the storage medium of the computer system. Further, the instructions of an operating system 306 are stored in a third memory 33 that can be the hard disk or other types of storage medium. Still further, the instructions of a gaming system 307 are stored in a fourth memory 34 that can also be the hard disk or other types of storage medium.

More specifically, the UEFI BIOS is specified to have a boot block 301, a main block 302 and a fixed variable block 303, as shown in the schematic diagram. The boot block 301 is one of the partitions defined in BIOS. The boot block 301 is used to verify that the code section of the BIOS is intact before transferring control to the code section. The main block 302 is referred to for storing the main codes of the UEFI BIOS that may also, but not limited to, be a section for recording the cryptography module. The variable block 303 is generally a portion for the UEFI BIOS to store the UEFI variables. The variables are designed to be modified in every booting process. This fixed variable block 303 is particularly attributed by a hardware-based or software-based verification method.

It should be noted that the second memory, the third memory and the fourth memory are either in a same storage device, with three different partitions being in one storage device, or in three separate storage devices. Specifically, the operating system 306 can be stored in one of the partitions of the third memory 33, and the codes of gaming system 307 can be stored in one of the partitions of the fourth memory 34. In an exemplary embodiment, the gaming system can also be one part of the operating system and have an independent partition. This means that the third memory 33 and the fourth memory 34 can be two separate partitions of a same hard disk, or that they may be two separate physical hard disks or other types of the storage medium.

The mechanism of the security verification operation allows the system to partition the second memory 32 into several spaces to store the secured digest(s) 304. Over a memory I/O bus, the second memory 32 is configured to store the secured digest(s) 304 rendered from the first memory 31, the third memory 33 and the fourth memory 34. In the present example, the secured digests 304 includes a first digest that is generally created from the data in the write-protected variable block 303 of the UEFI BIOS in the first memory 30 by performing an encryption algorithm. The secured digests 304 includes a second digest that is created from the operating system 306 in the third memory 33. The secured digests 304 includes a third digest that is created from the gaming system 307 in the fourth memory 34. The dotted lines shown in the FIG. 3 indicate that the secured digests 304 stored in the second memory 32 are created by the cryptography module respectively from the fixed variable block 303 or the whole firmware of the UEFI BIOS, the operating system 306 and the gaming system 307. A specific encryption algorithm is performed upon the bits and bytes relating to the UEFI BIOS and other kinds of storage medium. It should be noted that, for allowing the driver of UEFI BIOS to scan the secured digests 304 before the security verification operation, the remaining space 305 of the second memory 32 other than the space occupied by the secured digests 304 is set as void in compliance with a specification of UEFI. In one aspect of the disclosure, pointers can be used to designate addresses pointing to the areas storing the secured digests 304 and allow the processor to access the digests 304 for the further security verification.

In an exemplary embodiment, the cryptography module installed in the UEFI BIOS is such as a driver provided to perform an encryption algorithm to the variables in a variable block or the firmware of UEFI BIOS, and to the content of the storage medium. The encryption algorithm is such as an SHA (Secure Hash Algorithm) that is used to perform a cryptographic hash algorithm in order to create the digests by bit-to-bit computing the variable block of UEFI BIOS and the operating system/gaming system stored in the storage medium. One further encryption algorithm is such as an RSA algorithm (RSA standing for Ron Rivest, Adi Shamir and Leonard Adleman, who first publicly described the algorithm in 1977) that is used to perform an asymmetric encryption algorithm. Note that the encryption algorithm applied to the method for security verification in the booting process of the present disclosure is not be limited to any of the aforementioned approaches.

Figure 4:
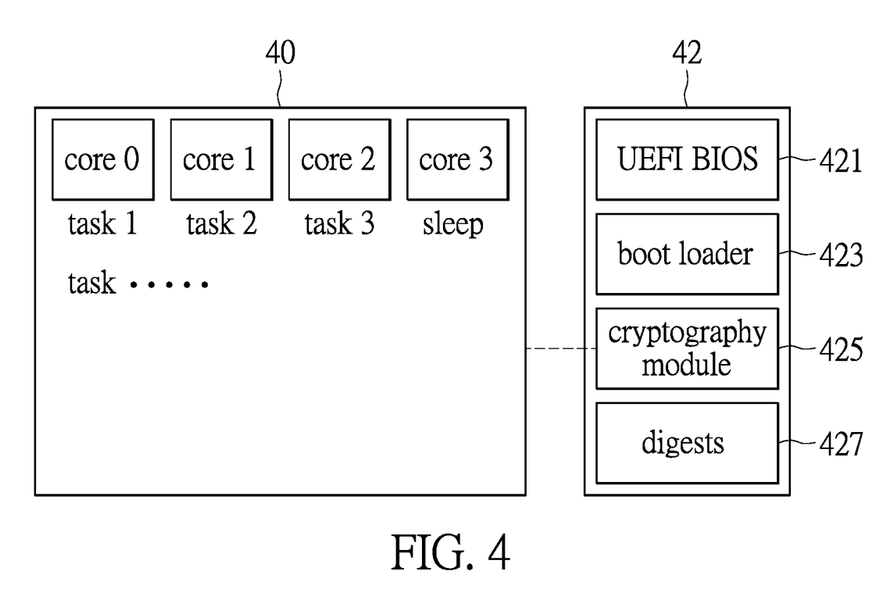
FIG. 4 shows a schematic diagram depicting a system for operating the security verification of the present disclosure.

The security verification operation in the booting process can be applied to both the UEFI BIOS and the storage medium. The method for security verification of the present disclosure carries out a parallel process in the booting process using the multi-core processor of the computer system. Reference is made to FIG. 4 showing a schematic diagram depicting a system for operating the security verification of the present disclosure.

A multi-core processor 40 of the computer system includes two or more processors, i.e. the cores, packaged into an integrated circuit (IC) that can enhance performance of the system. In the booting process of the computer system, the independent cores can process their own threads in parallel. In the diagram, the multi-core processor 40 is exemplified as a quad-core processor that includes four cores, e.g. the core 0, core 1, core 2 and core 3. The booting process can be a restart or a rebooting process. The system having the multi-core processor 40 in the initialization sequence is configured to assign one of the cores as a bootstrap processor (BSP), and the remainders as the application processors (APs) when the core is eligible to be the BSP through a detection sequence. The BSP executes the UEFI BIOS's boot-strap code to configure the systematic environment, to set up data structures, and to start and initialize the APs. For example, the core 0 acts as the BSP since a register of the core 0 generates a BSP flag. The programs of the aforementioned cryptography module 425 are installed in a flash memory 42 that is used to store the codes of the UEFI BIOS 421 according to the present embodiment.

When the system is booted, the UEFI BIOS 421 initializes the multi-core processor 40 and peripherals of the computer system. The BSP and APs of the multi-core processor 40 are initialized in the booting process. Also, the UEFI BIOS 421 reads a boot loader 423. The boot loader 423 is a program installed in the flash memory 42 that loads an operating system or other system software to a system memory after the booting process, i.e. a power-on self-test process. In the booting process, when the multi-core processor 40 is initialized by the UEFI BIOS 421, the APs initialize themselves and go to sleep to wait for the BSP to activate them to begin executing instructions, for example the security verification operation. In one aspect, the cryptography module 425 performs the security verification operation for initially assigning multiple verification tasks to be processed by the independent cores, i.e. the BSP and the APs.

The cryptography module 425 is specifically used to determine if the firmware codes of the UEFI BIOS are improperly modified. In the meantime, the system also determines if the codes of an operating system and/or a gaming system have been tampered with. Before the security verification operation, the system initially computes a BIOS digest that is related to the characteristic values created from an initial state or a previously approved state of the UEFI BIOS. The BIOS digest is one of the digests 427 that are stored to a specific space of the memory of the system, e.g. the flash memory 42 of the present example. The system also initially computes a storage digest that is related to the characteristic values created from an initial state or a previously approved state of a storage medium. In one of the embodiments, the storage digest is related to the initial state or the previously approved state of the operating system and/or the gaming system. The storage digest is also one of the digests 427, and more specifically and exemplarily, an operating-system digest and a gaming-system digest.

The diagram of FIG. 4 exemplarily shows the four cores (core 0, core 1, core 2 and core 3) of the multi-core processor 40. The BSP, e.g. the core 0, has an initial value when it is initiated. The APs, e.g. the core 1, core 2 and core 3, have the initial values that are synchronized with the BSP when the processor is initiated. The cryptography module 425 acts as a controller of the multi-core processor 40. Referring to the digests 427, the cryptography module 425 performs the security verification operation to the UEFI BIOS 421, the operating system, and optionally the gaming system. In particular, the cryptography module 425 instructs the multiple cores to perform tasks, e.g. the security verification task 1, task 2 and task 3, with respect to the different targets in their independent processing threads under an MP Service Protocol.

The multiple tasks are required to be processed by the multi-core processor 40. In one task, the cryptography module 425 instructs one of the cores to compute a present BIOS digest that records the current state of the UEFI BIOS in the present booting process and to compare this present BIOS digest with the authentic and known BIOS digest that is stored in a memory of the computer system in advance. Therefore, the cryptography module 425 can check if the UEFI BIOS has been modified. In another task, the cryptography module 425 instructs another core to compute a present operating-system digest that records the current state of the operating system and to compare the present operating-system digest with the authentic and known operating-system digest stored in the memory of the computer system. The cryptography module 425 can determine whether or not the operating system has been improperly modified. In one further task, optionally, the cryptography module 425 instructs one further core to compute a present gaming-system digest that records the current state of the gaming system and to compare the present gaming-system digest with the authentic and known gaming-system digest that is stored in the memory of the computer system in advance. The cryptography module 425 can therefore determine if the gaming system has been modified. It should be noted that the exemplified four cores may process the tasks that are allocated by the cryptography module 425 in an order or out of order. In an example, the four independent cores may separately accept the tasks allocated by the cryptography module 425 in addition to processing their original tasks assigned by the system during the booting process.

Figure 5:
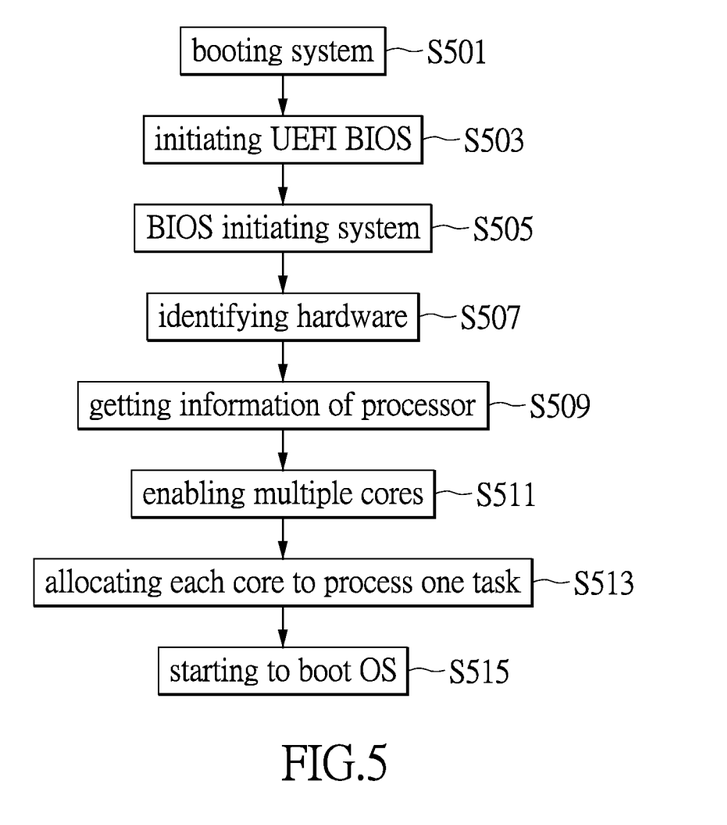
FIG. 5 shows a flow chart describing a method for security verification in a booting process of a computer system in one embodiment of the present disclosure.

Reference is made to FIG. 5, in view of FIG. 4, showing a flow chart describing the method for security verification in the booting process according to one embodiment of the present disclosure. The method is essentially implemented by a system, e.g. the computer system that is with a multi-core processor. The system provides various memories for different uses. For example, the system includes a first memory that stores firmware of the UEFI BIOS, and more specifically the first memory is such as a flash memory that is a solid-state storage device and modifiable for various purposes. The system provides a second memory that stores a BIOS digest, an operating-system digest, and a gaming-system digest. These digests record a known and authentic initial state and the previously approved state of the system. The second memory can be any non-volatile memory, e.g. a flash memory or a hard disk, of the computer system. The system also provides a third memory that stores codes of the operating system of the computer system, and optionally a fourth memory that stores codes of the gaming system in the computer system. In one exemplary embodiment, a specific sequence, e.g. initiated by a cryptography module, is provided to perform the method for security verification in the booting process with the multi-core processor.

In the method for security verification of the present disclosure, the computer system is booted in a beginning step S501. In the booting process, such as step S503, a UEFI BIOS is initiated and initialized. In step S505, the BIOS then initiates this computer system and the cryptography module can also be initiated at the same time. The cryptography module initiates a sequence in the booting process for identifying hardware of the computer system, such as in step S507. The cryptography module can receive information of the multiple cores by detecting the multi-core processor, such as in step S509. Multiple tasks demanded to be processed in the booting process can be acknowledged by the cryptography module. Therefore, such as in step 511, a certain number of the multiple cores are enabled in response to the plurality of tasks required in the booting process. Through the cryptography module, the enabled cores are separately allocated to process the tasks using their proprietary processing threads, such as in step S513.

In an exemplary embodiment, a first core is allocated to verify the firmware of the UEFI BIOS in a first task, a second core is allocated to verify codes of the operating system of the computer system in one other task, and optionally a third core is allocated to verify codes of the gaming system in one further task. After these tasks have been completed, the system will decide whether or not to start booting the operating system of the computer system, in step S515. After the booting process, the computer system begins booting the operating system when all the UEFI BIOS, the operating system and the gaming system have been verified due to the present digests being identical to the digests computed by the known and authentic initial state (the previously approved state) of the system.

To sum up, the method for security verification in the booting process is especially implemented by a multi-core processor of a computer system. When the multiple cores of the processor have been initialized in the booting process, a sequence running the MP-service protocol will instruct every enabled core to process one corresponding task, e.g. the security verification operations performed to the UEFI BIOS and the operating system/gaming system, in addition to retrieving the number of logical processing cores. The method and the system achieve an efficient way to verify information security of the system and effectively speed up the booting process that deals with a security verification operation in the computer system.

It is intended that the specification and depicted embodiments be considered exemplary only, with a true scope of the invention being determined by the broad meaning of the following claims.

What is claimed is:

1. A method of verifying software in a booting process of a gaming machine having a multi-core processor, a cryptographic module, and one or more storage media, the method comprising:
    initiating a Unified Extensible Firmware Interface (UEFI) of a basic input/output system (BIOS) of the gaming machine, the UEFI BIOS comprising UEFI variables stored in a fixed variable block, the UEFI variables enabling interaction between an operating system and firmware;
    identifying, using the cryptographic module, a plurality of enabled cores of the multi-core processor, the plurality of enabled cores comprising a first, second, and third core, and the cryptographic module comprising a firmware-based driver stored in the one or more storage media;
    allocating, using the cryptographic module, the first core of the multi-core processor to verify the UEFI BIOS and generate a first digest value based on the UEFI variables;
    allocating, using the cryptographic module, the second core to verify the operating system of the gaming machine and generate a second digest value;
    allocating, using the cryptographic module, the third core to verify gaming system software of the gaming machine,
    wherein the UEFI BIOS, the operating system, and the gaming system software are stored in one or more storage media of the gaming machine, and
    wherein security verifications of the UEFI BIOS, operating system, and gaming system software are performed in parallel, and wherein the security verifications comprise a parallel hash of the UEFI variables and the operating system.

2. A method as recited in claim 1 further comprising:
    calculating a UEFI BIOS digest using an initial, untampered state of the BIOS, thereby creating an authentic BIOS digest, said calculating performed by the cryptographic module in the UEFI BIOS.

3. A method as recited in claim 1 further comprising:
    calculating an operating system digest using an initial, untampered state of the operating system, thereby creating an authentic operating system digest, said calculating performed by the cryptographic module in the UEFI BIOS.

4. A method as recited in claim 1 further comprising:
    calculating a gaming system digest using an initial, untampered state of the gaming system software, thereby creating an authentic gaming system digest, said calculating performed by the cryptographic module in the UEFI BIOS.

5. A method as recited in claim 1 further comprising:
    calculating a boot-time UEFI BIOS digest using a booting-process version of the UEFI BIOS; and
    calculating a boot-time operating system digest using a booting process version of the operating system of the gaming machine, said calculations performed by the cryptographic module in the UEFI BIOS.

6. A method as recited in claim 1 further comprising:
    calculating a boot-time gaming system digest using a booting process version of the gaming system software of the gaming machine, said calculation performed by the cryptographic module in the UEFI BIOS.

7. A method as recited in claim 5 wherein allocating a first core to verify the UEFI BIOS further comprises:

detecting one or more differences between the authentic UEFI BIOS digest and the boot-time UEFI BIOS digest, said detecting processed by the cryptographic module.

8. A method as recited in claim 5 wherein allocating a second core to verify the operating system further comprises:

detecting one or more differences between the authentic operating system digest and the boot-time operating system digest, said detecting processed by the cryptographic module.

9. A method as recited in claim 6 wherein allocating a third core to verify the gaming system software further comprises:

detecting one or more differences between the authentic gaming system digest and the boot-time gaming system software digest, said detecting processed by the cryptographic module.

10. A method as recited in claim 7 further comprising:

preventing completion of the booting process of the gaming machine upon detecting the one or more differences between the authentic UEFI BIOS digest and the boot-time UEFI BIOS digest.

11. A method as recited in claim 8 further comprising:

preventing completion of the booting process of the gaming machine upon detecting the one or more differences between the authentic operating system digest and the boot-time operating system digest.

12. A method as recited in claim 9 further comprising:

preventing completion of the booting process of the gaming machine upon detecting the one or more differences between the authentic gaming system software digest and the boot-time gaming system software system digest.

13. A method as recited in claim 1 further comprising:

identifying hardware components and storage media of the gaming machine; and assigning a plurality of tasks associated with the allocation of the first core, allocation of the second core, and allocation of the third core.

14. A gaming machine comprising:

a multi-core processor configured to perform security verifications in parallel, the multi-core processor comprising:

a first core being configured to verify a Unified Extensible Firmware Interface (UEFI) BIOS and generate a first digest value based on UEFI variables;

a second core being configured to verify an operating system of the gaming machine and generate a second digest value; and a third core being configured to verify gaming system software of the gaming machine;

a first memory storing the UEFI BIOS and the cryptographic module, the UEFI BIOS comprising the UEFI variables stored in a fixed variable block, the UEFI variables enabling interaction between the operating system and firmware, the cryptographic module comprising a firmware-based driver configured to identify a plurality of enabled cores of the multi-core processor, and allocate the plurality of enabled cores to the security verifications, the plurality of enabled cores comprising the first, second, and third core;

a second memory storing the first digest value which is a known and authenticated BIOS digest, the second digest value which is a known and authenticated operating system digest, and a known and authenticated gaming system digest;

a third memory storing the operating system; and a fourth memory storing gaming system code.

* * * * *